United States Patent [19]

Girg et al.

[11] Patent Number: 5,432,215

[45] Date of Patent: Jul. 11, 1995

[54] BUILDING MATERIAL PRODUCTS CONTAINING ORGANIC POLYMERS AS THICKENERS

[75] Inventors: Friedrich Girg, Idstein; Jozef Böhme-Kovac, Dexheim, both of Germany

[73] Assignee: Hoechst AG, Frankfurt, Germany

[21] Appl. No.: 852,313

[22] Filed: Mar. 18, 1992

[30] Foreign Application Priority Data

Mar. 20, 1991 [DE] Germany ............... 41 09 092.6

[51] Int. Cl.⁶ ................... C08L 5/04; C08L 1/02; C08L 1/26; C08L 3/00
[52] U.S. Cl. ......................... 524/28; 524/35; 524/42; 524/43; 524/44; 524/45; 524/46; 524/47; 524/50; 524/55
[58] Field of Search ............ 524/28, 35, 42, 43, 524/44, 45, 46, 47, 50, 55, 5, 6

[56] References Cited

U.S. PATENT DOCUMENTS

| | | | |
|---|---|---|---|
| 3,854,985 | 12/1974 | Suzuki et al. | 524/46 |
| 4,157,264 | 6/1979 | Kennedy-Skipton | 524/5 |
| 4,236,849 | 12/1980 | Kennedy-Skipton | 166/293 |
| 4,373,036 | 2/1983 | Chang et al. | 524/42 |
| 4,414,032 | 11/1983 | Schrattenholz et al. | 524/44 |
| 4,542,168 | 9/1985 | Chang et al. | 524/28 |
| 4,654,085 | 3/1987 | Schinski | 524/5 |
| 4,883,535 | 11/1989 | Hamaguchi et al. | 524/5 |
| 5,102,462 | 4/1992 | Podlas | 524/43 |
| 5,258,429 | 9/1993 | Kniewske et al. | 524/47 |

FOREIGN PATENT DOCUMENTS

| | | | |
|---|---|---|---|
| 0346097 | 12/1989 | European Pat. Off. | 524/55 |
| 0416405 | 3/1991 | European Pat. Off. | |
| 2574781 | 6/1986 | France | 524/44 |
| 2735216 | 3/1978 | Germany. | |
| 3716974 | 12/1987 | Germany. | |
| 3920025 | 1/1991 | Germany. | |
| 57-195124 | 11/1982 | Japan. | |
| 0195124 | 11/1982 | Japan | 524/47 |
| 0055041 | 3/1985 | Japan | 524/45 |
| 60-55041 | 3/1985 | Japan. | |
| 0036376 | 2/1986 | Japan | 524/45 |
| 61-36376 | 2/1986 | Japan. | |

OTHER PUBLICATIONS

Grant & Mackh's Chemical Dictionary, Fifth Edition McGraw Hill Book Company 1987, p. 177.

Primary Examiner—Peter A. Szekely
Attorney, Agent, or Firm—Connolly & Hutz

[57] ABSTRACT

Building material products, such as, for example, jointing compounds, adhesives, emulsion paints, synthetic plasters, fillers and the like, comprising a mixture of a) at least 10% by weight, in particular 10 to 99% by weight, of a water-soluble natural polymer and derivatives thereof, b) 1 to 89% by weight of an alkali metal salt or ammonium salt of a crosslinked polyacrylate which, if desired, is grafted with a starch, and c) 0 to 60% by weight of a water-soluble alkali metal salt or alkaline earth metal salt of arylsulfonic acid/formaldehyde condensation products or of a sulfomodified melamine/formaldehyde polycondensation product.

14 Claims, No Drawings

BUILDING MATERIAL PRODUCTS CONTAINING ORGANIC POLYMERS AS THICKENERS

It is known that derivatives of natural polymers, such as cellulose ethers, xanthan gums, guar derivatives are capable of increasing the viscosity in aqueous media to a substantial degree as a function of their chain length and concentration. The physical effects linked thereto make it possible to utilize these substances as thickeners, water-retention agents, protective colloids, dispersants, stabilizers and binders in a large number of industrial applications. The variety of properties of these polymers enables their complex use in a wide range of different industrial and product sectors. These include building materials, paints, adhesives, detergents and cleaning compositions, cosmetics, foodstuffs, pharmaceuticals, products of the textile, leather, paper, and ceramics industries.

The crucial and most important characteristic of the polymers is their viscosity in aqueous solution under specific conditions (concentrations, temperature, measuring device, shear gradient). For many applications, polymers are required which, when dissolved in water, give high viscosities, as a result of which a high thickening effect and water retention but also a significant improvement in stability can be achieved, ideally at relatively low concentrations of the polymers.

Many measures aim at increasing the viscosity-increasing effect of the polymers and raising their economy and efficiency. Particularly careful selection of the starting raw materials (in the case of cellulose ethers: high-quality chemical pulps or cotton linters), in combination with chemical reactions avoiding excessive chain degradation (for example etherification) and particular measures for gentle drying and fine grinding are the prerequisite for maintaining a high degree of polymerization and preparing highly viscous macromolecular substances. Moreover, the chain length of the polymers can be lengthened by suitable chemical reactions, for example by crosslinking reactions with dichlorinated aromatics or olefins.

For example, in the case of cellulose ethers the measures and developments mentioned lead to viscosity ranges (measured as a 2% aqueous solution) of more than 100,0000 mPa.s, in exceptional cases of up to 400,000 mPa.s. Despite fine grinding under gentle conditions to give usable powdered products, nevertheless, chain degradation of the polymers, which in some cases can be significant, and which necessarily leads to reduced viscosities takes place. This involves economic disadvantages, since high-quality raw materials are expensive and a complicated process resulting in reduced yield is necessary for the preparation.

Furthermore, it is known that polyacrylates are used in the form of their alkali metal salts and ammonium salts as valuable thickeners for controlling the rheology of aqueous systems, for example in emulsion paints, paste-like fillers and adhesives. A special group are the crosslinked polyacrylates or polyacrylates which are crosslinked and additionally grafted with starch, which are increasingly being used as so-called superabsorbents (SAPs) in hygiene articles (diapers, sanitary napkins), in agriculture and in horticulture, in the transport of sensitive foodstuffs, in pharmaceutics, cosmetics, internal construction, as sludge solidifier and for sealing landfills.

The capacity of these polymers to absorb large volumes of aqueous liquids with the formation of a stable gel structure and even to withstand stress is the prerequisite for their successful use in the areas described above. It is true that experimental applications of SAPs in the areas of building materials, paints and adhesives show a thickening effect, which in some cases is clearly noticeable, despite their distinct properties to absorb extraordinarily high amounts of aqueous liquids (up to 400 to 1000 times their own weight), but they do not even come close to reaching the high water retention capacity of natural polymers (such as, for example, of cellulose ethers) which is also necessary for the above-mentioned systems.

Furthermore, it is known that alkali metal salts and alkaline earth metal salts of the condensation products of arylsulfonic acids, i.e. of phenolsulfonic acids and naphthalenesulfonic acids, are used together with formaldehyde as stabilization aid, dispersants, plasticizing agents and liquefying agents in various branches of industry. The condensation products mentioned are of particular importance as plasticizing and liquefying agents in concrete and mortar production in the building industry.

The high dispersability and liquefying effect lead in mortar and concrete, especially where a large amount is metered in, to extensive deposition of a water/binder slurry, as a result of which the initially present good plasticity and processability is substantially lost upon storage of the mortar or concrete, due to high internal compression.

A simple and low-cost method is desired which significantly increases the viscosity ranges of the natural high polymers in aqueous media and thus substantially improves the thickening effect.

Surprisingly, it has now been found that by using combinations of water-soluble natural polymers or derivatives thereof, such as cellulose ethers, xanthan gums, guar derivatives, starch ethers, carobseed flour with alkali metal salts and ammonium salts of crosslinked and optionally additionally starch-grafted polyacrylate superabsorbents, and, if desired, with additions of alkali metal salts and alkaline earth metal salts of condensation products of naphthalenesulfonic acid or phenolsulfonic acid with formaldehyde or with sulfomodified melamine/formaldehyde polycondensation products, viscosity ranges in aqueous media can be achieved which are significantly higher than those of the starting substances mentioned. Combinations of the natural polymers mentioned or derivatives thereof with superabsorbents alone produce a significant increase in the viscosity ranges compared with those of the starting substances used.

The invention relates to building material products comprising a mixture of
a) at least 10% by weight, in particular 10 to 99% by weight, preferably 40 to 90% by weight, of a water-soluble natural polymer and derivatives thereof,
b) 1 to 89% by weight, preferably 5 to 60% by weight, of an alkali metal salt or ammonium salt of a crosslinked polyacrylate which, if desired, is additionally grafted with a starch, and
c) 0 to 60% by weight, preferably 1 to 40% by weight, of a water-soluble alkali metal salt or alkaline earth metal salt of arylsulfonic acid/formaldehyde condensation products or of a sulfo-modified melamine/formaldehyde polycondensation product.

The term "building material products" is here and hereinafter understood to mean fillers, adhesives, emulsion paints, synthetic plasters, jointing compositions and other products of this type.

In order to increase the viscosity, these products contain a mixture of the abovementioned components a) to c) in the composition given. These components will be described below in more detail.

a) water-soluble natural polymers and derivatives thereof

Preferred examples of these are the following products:

1. Cellulose ethers

The viscosity limits of these cellulose ethers are usually 10–500,000, in particular 50–150,000, mPa · s (measured as a 2% aqueous solution using a Höppler falling-ball viscometer at 20° C. in distilled water). The most important cellulose ethers in practical application have the following etherification data:

|  | DS | MS |
|---|---|---|
| Methylcellulose | 1.4–2.3 | |
| Methylhydroxyethyl-cellulose | 1.3–2.0 | 0.05–0.5 |
| Methylhydroxypropyl-cellulose | 1.3–2.2 | 0.1–1.0 |
| Hydroxyethylcellulose | — | 1.8–3.5 |
| Hydroxyethylhydroxy-propylcellulose | | MS HE: 0.9–1.2 MS HP: 0.6–0.9 |
| Hydroxypropylcellulose | — | 2–3.5 |
| Ethylhydroxyethyl-cellulose | 0.7–1.2 | 0.8–2.7 |
| Carboxymethylcellulose | 0.5–1.5 | — |
| Carboxymethylhydroxy-ethylcellulose | 0.3–0.6 | 0.3–2.3 |
| Alkoxyhydroxypropyl-hydroxyethylcellulose | — | 1.5–3.5 |

Alkoxy group:
straight-chain or branched, 2–8 carbon atoms, 0.05–50%, relative to the weight of the substituted cellulose ether

| Carboxymethylated methyl- | DS OCH$_3$ | MS |
|---|---|---|
| hydroxyethyl- or | 1.3–2.0 | 0.05–0.5 |
| methylhydroxypropyl-cellulose | 1.3–2.2 | 0.1–1.0 |

2. Starch ethers

| Hydroxypropylstarch: | MS | 0.1–0.8 |
| Carboxymethylstarch: | DS | 0.1–0.8 |
| Hydroxypropylcarboxy-methylstarch: | DS | 0.1–0.5/MS 0.1–0.8 |
| Viscosity limits: | 1–10,000 mPa · s (2% aqueous solution) measured using a Höppler viscometer at 20° C. and in distilled water | |

3. Guar gum derivatives

| Guar endosperm flour (natural galactomannan) Viscosity (1% in water): (measured using a Brookfield RVT, 25° C. 20 rpm) | 100–20,000 mPa · s |
| Carboxymethylguar Viscosity (3% in water): | 100–20,000 mPa · s |
| Hydroxypropylguar Viscosity (1% in water): | 100–10,000 mPa · s |
| Carboxymethylhydroxy-propylguar Viscosity (1% in water): | 100–20,000 mPa · s |
| Cationized guar (quaternary substitution DS about 0.13) Viscosity (1% in water): | 100–20,000 mPa · s |
| 4. Xanthan gum (Polysaccharides, anionic, prepared by fermentation and extraction of Xanthomonas campestris) Viscosity (1% in water): | 100–10,000 mPa · s |

5. Carobseed flour
6. Alginates
b) Superabsorbents (SAPs)

Superabsorbents are lattice structures based on neutralized polyacrylic acid formed in free-radical copolymerization of monomers in the presence of small amounts of certain crosslinking agents. Functionality and reactivity of the crosslinking agents is of great importance for the properties of a superabsorbent.

There are 2 main principles for preparing a polymer lattice structure:

a) the lattice (lattice structure) is synthesized in a single polymerization step, starting with the monomers, for which certain crosslinking agents are required for branching and formation of the lattice structure.

b) A previously synthesized straight-chain or branched polymer is crosslinked.

For the preparation of SAPs, the method mentioned under a) has by far the greatest importance; for specific products, method b) is used. Various techniques are used for the polymerization process (for example emulsion polymerization and gel polymerization). In this process, an aqueous solution of the monomer acrylic acid is polymerized in the presence of small amounts of a crosslinking agent (polyfunctional monomer). Water serves as diluent and solvent (exothermic process) so as to avoid high temperatures. Polymerization can be carried out in a reactor or by means of the thin-film process; concentrations of up to 60% are customary.

The superabsorbents can also be grafted with starch. This grafting with starch is carried out during the polymerization and crosslinking process in a one-pot process. This starch is heated in water to dissolve it and is added as a solution at the beginning of the polymerization process. The proportion of starch, relative to the SAP, can be 3–30% by weight.

Superabsorbents can only absorb in the pH range from 4 to 10; (partial) neutralization can be carried out before or after polymerization. The product formed by polymerization is a moist gel, which is comminuted using a gel cutter and then dried.

Crosslinking for preparing SAPs substantially takes place via covalent bonds, i.e. by using polyfunctional monomers during polymerization (crosslinking agent containing double bonds).

Further crosslinking possibilities via covalent bonds are provided by polyfunctional molecules (diepoxides, azirines, polyalcohols). Already present, slightly crosslinked polymer chains are additionally crosslinked on the surface by means of the crosslinking agents mentioned.

This makes it possible to combine the good absorption properties of the slightly crosslinked superabsorbents (which have high absorption capacity but also large amounts of extractable material and a low absorption ratio, due to gel blocking) with the advantages of highly crosslinked SAPs (no gel blocking, better absorption capacity and absorption stability under compressive stress).

Important crosslinking reagents for the preparation of SAPs are a) methylenebisacrylamide; a crosslinking agent having high reactivity but leading to SAPs of less resistance to compression;

b) diethylene glycol dialkyl ether; a crosslinking agent having less reactivity, which makes it possible to prepare SAP gels having better elastic properties and higher stability under compressive stress;

c) vinyl compounds (vinyl ethers, vinyl esters, vinylphosphonic acid).

In order to achieve an optimum crosslinking and lattice structure of the SAPs, mixtures of crosslinking reagents of high and low reactivity are used in the preparation process, it being possible to modify the density and constitution of the lattice structures over a wide range and adjust them as required by varying the mixing ratios of the crosslinking components used accordingly.

Suitable components c) are:
1. Polycondensation products of naphthalenesulfonic acid with formaldehyde in the form of their alkali metal salts, ammonium salts and alkaline earth metal salts;

2. Sulfo-modified melamine/formaldehyde polycondensation products in the form of their alkali metal salts or ammonium salts.

The pulverulent and granulated components a), b) and if desired, c) can be individually admixed to the building material products or first components a), b) and c) are mixed by themselves, and this mixture is then added to the building material products. Incorporation of these components in the building material products takes place by conventional stirring and mixing processes, for example by kneading. The sum of components a), b) and c) in the building material products is 0.01 to 2, preferably 0.1 to 0.5, % by weight, relative to the dry composition.

Components a), b) and c) can also be mixed with one another during their preparation, for example by thorough mixing or kneading before or after the drying process during preparation of the respective components. A subsequent joined fine milling produces particularly homogeneous and rapidly acting thickening systems. For combinations obtained by simply mixing the components, superabsorbents having a particle fineness of <0.1 mm have proven to be particularly suitable.

The mixtures described have a strong thickening effect in aqueous medium. In addition, depending on the particular composition of these mixtures, some of them exhibit marked pseudoplasticity, which is mediated to liquidic/pasty systems and causes therein a remarkable structuring effect. The mixtures described are therefore particularly suitable as additives for building material products. These include paste-like tile adhesives, fillers and jointing compounds (in powder form or paste-like, in combination with plastic dispersions, polyvinyl alcohols, animal glue, casein as organic binder), jointing compounds based on polyacrylate and made elastic or plastic, plastic emulsion paints.

This improvement in the structural properties in combination with an increased thickening effect caused by the combinations described makes it possible to omit completely or in part previously required mineral thickening and structuring aids, such as, for example, bentonites, attapulgites, highly disperse silicas. The substantial disadvantage of these inorganic thickeners, i.e. the strong increase in shrinkage behavior before and after hardening or drying of building material systems prepared therewith, can be reduced to a large extent or eliminated by the combinations described. Moreover, they lead to a reduction in costs as a result of reduced amounts used of the combinations compared with the customary amounts of natural polymers added. The claimed combinations moreover improve the processability and smoothness of liquidic pasty systems. The tackiness of building material products containing highly viscous cellulose ethers as thickeners and water retention agents, which is often troublesome, is significantly reduced by using the combinations mentioned. In mineral-based building material systems too, additions of the claimed combinations have a positive effect on processability. The resulting reduced tackiness enables the mortar and plastic compositions to be smoothened more easily. These properties also have an advantageous effect in concrete mixtures (underwater concrete, gunned concrete, pumped concrete), whose homogeneity, stability and pumpability are improved.

Examples:

For the mixtures described below, the following individual components were used:

|  | Viscosity level measured in 2% aqueous solution | Degree of etherification | |
|---|---|---|---|
|  |  | DS | MS |
| Methylhydroxyethylcellulose (1) | 30,000 | 1.5 | 0.12 |
| Methylhydroxyethylcellulose (2) | 50,000 | 1.5 | 0.11 |
| Methylhydroxyethylcellulose (3) | 6,000 | 1.5 | 0.13 |
| Methylhydroxyethylcellulose (4) | 6,000 | 1.5 | 0.10 |
| Methylhydroxyethylcellulose (5) | 15,000 | 1.8 | 0.12 |
| Methylhydroxyethylcellulose (6) | 6,000 | 1.6 | 0.15 |
| Methylhydroxyethylcellulose (7) | 30,000 | 1.55 | 0.21 |
| Methylhydroxyethylcellulose (8) | 6,000 | 1.64 | 0.24 |
| Methylhydroxyethylcellulose (9) | 4,000 | 1.88 | 0.21 |
| Hydroxyethylcellulose | 6,000 | — | 2.1 |
| Carboxymethylhydroxyethylcellulose | 3,000 | 0.55 | 0.75 |
| Ethylhydroxyethylcellulose | 1,000 | 0.97 | 1.9 |
| Methylhydroxypropylcellulose | 4,000 | 1.88 | 0.21 |
| Alkoxyhydroxypropylhydroxyethylcellulose | 25,000 | DS = $OC_3H_5(OH)$—$OC_4H_9$ 0.05 MS = $OC_2H_4$ 2.45 | |

-continued

| | | | |
|---|---|---|---|
| Alkoxyhydroxypropylhydroxy-ethylcellulose | 25,000 | $DS = OC_3H_5(OH)$—$OC_4H_9$ 0.08 $MS = OC_2H_4$ 3.40 | |
| Hydropropylstarch (crosslinked with epichlorohydrin) | 1,300 (5% aqueous solution) | — | 0.64 |
| Guar gum (Mepro guar CSA 200/50) | 5,000 (1% solution) | — | — |
| Hydroxypropylguam (Jaguar ® 8060) | 4,000 (1% solution) | — | 0.42 |
| Carboxymethylhydroxy-propylguam (Jaguar ® 8600) | 3,800 (1% solution) | 0.06 | 0.40 |
| Guar gum, quaternary-substituted (Meyprofloc 130) | 2,000 (1% solution) | degree of quaternary substitution = 0.13 | |
| Xanthan gum (Rhodopol ® 50 MD) | starting viscosity: 6300 mPa·s (2% solution) | | |

| | Overall absorption capacity in | | Centri-fuging retention | Absorption capacity under pressure | Extract-able material (%) |
|---|---|---|---|---|---|
| | deionized $H_2O$ (g/g) | 0.9% NaCl sol. (g/g) | 0.9% NaCl sol. (g/g) | 0.9% NaCl sol. (ml/g) | |
| Superabsorbent (1) SANWET ® IM 1500 (Starch-grafted sodium polyacrylate) | 500 | 50 | 32 | 15 | 7 |
| Superabsorbent (2) SANWET ® IM 1000 (Starch-grafted sodium polyacrylate) | 1000 | 65 | 42 | 5 | 14 |
| Superabsorbent (3) SANWET ® IM 5000s (Starch-grafted sodium polyacrylate) | 400 | 48 | 32 | 32 | 3 |

| Properties | Sodium salt: Typical data |
|---|---|
| Naphthalenesulfonic acid/formaldehyde condensation product: | |
| Supplied | in liquid/pulverulent form |
| Concentration (active content) | 20–40%/70–96% |
| sodium sulfate content | 0–25% |
| Molecular weight | 4,000–40,000 |
| pH | 6.5–11 |
| Viscosity (23° C.) | 10–150 mPa·s liquid products) |
| Melamine/formaldehyde condensation product, sulfonated: | |
| Supplied | in liquid/pulverulent form, granules |
| Concentration (active content) | about 20%/80–100% |
| Molecular weight | 20,000–30,000 |
| pH | 8–12 |
| Density | liquid products: 1.1 g/cm³ solid products: 1.7–1.9 g/cm³ |

The mixtures described below of the abovementioned individual components were prepared by simply mixing the components in the relative amounts given. In each case, pbw is parts by weight.

| | | | Viscosity of the combination described, measured as an X% aqueous solution mPa·s |
|---|---|---|---|
| 1 | 1 pbw | of methylhydroxy-ethylcellulose (1) | 30,500 (as 1.3% aqueous solution) |
| | +0.15 pbw | of superabsorbent (1) | |
| | +0.15 pbw | of naphthalene-sulfonic acid/formal-dehyde condensation product sodium salt | |
| 2 | 1.7 pbw | of methylhydroxy-ethylcellulose (2) | 145,000 (as 2% aqueous solution) |
| | +0.21 pbw | of superabsorbent (2) | |
| | +0.009 pbw | of naphthalene- | |

-continued

| | | | Viscosity of the combination described, measured as an X% aqueous solution mPa·s |
|---|---|---|---|
| | | sulfonic acid/formal-dehyde condensation product sodium salt | |
| 3 | 1.4 pbw | of methylhydroxy-ethylcellulose (3) | 109,000 (as 2% aqueous solution) |
| | +0.40 pbw | of superabsorbent (1) | |
| | +0.20 pbw | of naphthalene-sulfonic acid/formal-dehyde condensation product sodium salt | |
| 4 | 1.6 pbw | of methylhydroxy-ethylcellulose (4) | 88,000 (as 2% aqueous (solution) |
| | +0.2 pbw | of superabsorbent (1) | |
| | +0.2 pbw | of naphthalene-sulfonic acid/formal-dehyde condensation | |

-continued

| | | | Viscosity of the combination described, measured as an X% aqueous solution mPa·s |
|---|---|---|---|
| 5 | 1.6 pbw | of methylhydroxyethylcellulose (5) | 102,000 (as 2% aqueous solution) |
| | +0.3 pbw | of superabsorbent (2) | |
| | +0.1 pbw | of naphthalenesulfonic acid/formaldehyde condensation product sodium salt | |
| 6 | 1.8 pbw | of methylhydroxyethylcellulose (6) | 73,000 (as 2% aqueous solution) |
| | +0.2 pbw | of superabsorbent (1) | |
| 7 | 0.5 pbw | of methylhydroxyethylcellulose (7) | 27,500 (as 1% aqueous solution) |
| | +0.5 pbw | of superabsorbent (1) | |
| 8 | 1.4 pbw | of hydroxyethylcellulose | 89,500 (as 2% aqueous solution) |
| | +0.4 pbw | of superabsorbent (1) | |
| | +0.2 pbw | of naphthalenesulfonic acid/formaldehyde condensation product sodium salt | |
| 9 | 1.8 pbw | of hydroxyethylcellulose | 30,000 (as 2% aqueous solution) |
| | +0.2 pbw | of superabsorbent (1) | |
| 10 | 1.6 pbw | of hydroxyethylcellulose | 48,000 (as 2% aqueous solution) |
| | +0.2 pbw | of superabsorbent (1) | |
| | +0.2 pbw | of naphthalenesulfonic acid/formaldehyde condensation product sodium salt | |
| 11 | 1.4 pbw | of carboxymethylhydroxyethylcellulose | 7,500 (as 2% aqueous solution) |
| | +0.4 pbw | of superabsorbent (1) | |
| | +0.2 pbw | of naphthalenesulfonic acid/formaldehyde condensation product sodium salt | |
| 12 | 1.7 pbw | of xanthan gum | 14,500 (as 2% aqueous solution) |
| | +0.3 pbw | of superabsorbent (1) | |
| 13 | 1.4 pbw | of xanthan gum | 18,200 (as 2% aqueous solution) |
| | +0.4 pbw | of superabsorbent (1) | |
| | 0.2 pbw | of naphthalenesulfonic acid/formaldehyde condensation product sodium salt | |
| 14 | 1.4 pbw | of methylhydroxypropylcellulose | 51,000 (as 2% aqueous solution) |
| | +0.4 pbw | of superabsorbent (1) | |
| | +0.2 pbw | of naphthalenesulfonic acid/formaldehyde condensation product sodium salt | |
| 15 | 1.4 pbw | of ethylhydroxyethylcellulose | 43,000 (as 2% aqueous solution) |
| | +0.4 pbw | of superabsorbent (1) | |
| | +0.2 pbw | of naphthalenesulfonic acid/formaldehyde condensation product sodium salt | |
| 16 | 1.7 pbw | of alkoxyhydroxypropylhydroxyethylcellulose (1) | 78,000 (as 2% aqueous solution) |
| | +0.3 pbw | superabsorbent | |
| 17 | 1.7 pbw | of alkoxyhydroxypropylhydroxyethylcellulose | 80,000 (as 2% aqueous solution) |
| | +0.2 pbw | superabsorbent (1) | |
| | +0.1 pbw | naphthalenesulfonic-acid/formaldehyde condensation product sodium salt | |
| 18 | 1.2 pbw | of methylhydroxyethylcellulose (8) | 450,000 (as 2% aqueous solution) |
| | +0.8 pbw | of superabsorbent (3) | |
| 19 | 1.7 pbw | of hydroxypropylstarch (crosslinked with epichlorohydrin) | 13,500 (as 2% aqueous solution) |
| | 0.3 pbw | of superabsorbent (1) | |
| 20 | 1.7 pbw | of guar gum (guar endosperm flour) | 94,000 (as 2% aqueous solution) |
| | +0.3 pbw | of superabsorbent (3) | |
| 21 | 1.7 pbw | of hydroxypropylguar | 61,000 (as 2% aqueous solution) |
| | +0.3 pbw | of superabsorbent (3) | |
| 22 | 1.7 pbw | of carboxymethylhydroxypropylguar | 44,000 (as 2% aqueous solution) |
| | 0.3 pbw | of superabsorbent (3) | |
| 23 | 1.7 pbw | of hydroxypropylguar | 45,000 (as 2% aqueous solution) |
| | 0.2 pbw | of superabsorbent (3) | |
| | +0.1 pbw | of naphthalenesulfonic acid/formaldehyde condensation product sodium salt | |
| 24 | 1.7 pbw | of guar gum, quaternary-substituted | strong gelling, not measurable, aqueous solution |
| | +0.3 pbw | of superabsorbent (3) | |
| 25 | 1.4 pbw | of methylhydroxyethylcellulose (3) | 73,000 (as 2% aqueous solution) |
| | +0.4 pbw | of superabsorbent (3) | |
| | +0.2 pbw | melamine/formaldehyde condensation product, sulfonated, sodium salt | |
| 26 | 1.4 pbw | of hydroxyethylcellulose | 32,000 (as 2% aqueous solution) |
| | +0.4 pbw | of superabsorbent (3) | |
| | +0.2 pbw | of melamine/formaldehyde condensation product, sulfonated, sodium salt | |
| 27 | 1.4 pbw | of carboxymethylhydroxyethylcellulose | 4,500 (as 2% aqueous solution) |
| | +0.4 pbw | of superabsorbent (2) | |
| | +0.2 pbw | of melamine/formaldehyde condensation product, sulfonated, sodium salt | |
| 28 | 1.4 pbw | of methylhydroxypropylcellulose | 39,000 (as 2% aqueous solution) |
| | +0.4 pbw | of superabsorbent (1) | |
| | +0.2 pbw | of melamine/formaldehyde condensation product, sulfonated, sodium salt | |
| 29 | 1.4 pbw | of ethylhydroxyethylcellulose | 14,300 (as 2% aqueous solution) |
| | +0.4 pbw | of superabsorbent (1) | |
| | +0.2 pbw | of melamine/formaldehyde condensation product, sulfonated, sodium salt | |
| 30 | 1.0 pbw | of xanthan gum | 15,700 (as 2% aqueous solution) |
| | +0.4 pbw | of superabsorbent (1) | |
| | +0.2 pbw | of melamine/formaldehyde condensation product, sulfonated, sodium salt | |
| 31 | 1.0 pbw | of hydroxypropylstarch | 7,400 (as 2% aqueous solution) |
| | +0.8 pbw | of superabsorbent (1) | |
| | +0.2 pbw | of melamine/formaldehyde condensation product, sulfonated, sodium salt | |
| 32 | 1.4 pbw | of methylhydroxyethylcellulose (9) | 102,000 (as 2% aqueous solution) |
| | +0.4 pbw | of superabsorbent (3) | |
| | +0.2 pbw | of naphthalenesulfonic acid/formaldehyde condensation product, calcium salt | |
| 33 | 1.4 pbw | of hydroxyethylcellulose | 63,500 (as 2% aqueous solution) |
| | +0.4 pbw | of superabsorbent (3) | |

-continued

| No. | Combination | Viscosity of the combination described, measured as an X% aqueous solution mPa·s |
|---|---|---|
| 34 | 1.4 pbw of guar gum (guar endosperm flour)<br>+0.4 pbw of superabsorbent (3)<br>+0.2 pbw of naphthalenesulfonic acid/formaldehyde condensation product, calcium salt | 70,000 (as 2% aqueous solution) |
| 35 | 1.4 pbw of hydroxypropyl guar<br>+0.4 pbw of superabsorbent (3)<br>+0.2 pbw of naphthalenesulfonic acid/formaldehyde condensation product, calcium salt | 55,800 (as 2% aqueous solution) |
| 36 | 1.4 pbw of xanthan gum<br>+0.4 pbw of superabsorbent (3)<br>+0.2 pbw of naphthalenesulfonic acid/formaldehyde condensation product, calcium salt | 14,600 (as 2% aqueous solution) |

1. Paste-like tile adhesive

| Components | a (comparative sample) pbw | b pbw | c pbw | d pbw |
|---|---|---|---|---|
| Filler mixture comprising finely ground calcium carbonate and ground mica | 67 | 67 | 67 | 67 |
| Bentonite | 1 | 1 | 1 | 0.8 |
| Hydroxyethylcellulose, viscosity level 100.000 mPa·s (2% aqeuous solution) | 0.68 | 0.4 | 0.30 | 0.30 |
| Superabsorbent (1) | — | 0.2 | 0.25 | 0.30 |
| Polycondensation product based on naphthalenesulfonic acid/formaldehyde alkali metal salt | — | — | 0.05 | — |
| Water | 20–25 | 20–25 | 20–25 | 20–25 |
| Plastic dispersion (based on styrene/acrylate) | 10 | 10 | 10 | 10 |
| Antifoam | 0.1 | 0.1 | 0.1 | 0.1 |
| Preservative | 0.15 | 0.15 | 0.15 | 0.15 |
| Aminomethylpropanol (as alkalising agent) | 0.1 | 0.1 | 0.1 | 0.1 |
| Antisliding behavior of stonework tiles (10 × 10 cm) on concrete (mm) | 2–3 | 1–2 | 2–3 | 0 |
| Skinning time (min) tested with stonework tiles (5 × 5 cm) on concrete | | | | |

Viscosity measurements of superabsorbent in water or superabsorbent + polycondensation products without use of derivatives of natural polymers

| | a ppw | b ppw | c ppw | d ppw | e ppw | f ppw | g ppw | h ppw | i ppw | j ppw | k ppw |
|---|---|---|---|---|---|---|---|---|---|---|---|
| Superabsorbent (1) | 0.2 | 0.2 | 0.2 | 0.4 | 0.4 | 0.4 | 0.6 | 0.6 | 0.6 | 0.4 | 0.4 |
| Naphthalenesulfonic acid/formaldehyde polycondensation product, sodium salt or calcium salt | — | 0.2 | — | — | 0.2 | 0.4 | — | 0.2 | — | 0.1 | — |
| Melamine/formaldehyde polycondensation product, sulfonated, sodium salt | — | — | 0.2 | — | — | 0.2 | — | — | 0.2 | — | 0.1 |
| Water | 99.8 | 99.6 | 99.6 | 99.6 | 99.4 | 99.4 | 99.4 | 99.2 | 99.2 | 99.5 | 99.5 |
| Viscosity measured using Brookfield RV 20 rpm, 25° C. RT | 3200 | 60 | 55 | 12000 | 200 | 185 | 20000 | 4000 | 4000 | 1500 | 1400 |
| Notes on appearance of samples: | gel-like material non-flowable | yellowish, clear, flowable | clear, colorless flowable | gel-like material non-flowable | yellowish, clear, flowable | clear, colorless flowable | gel-like material non-flowable | yellowish, clear | clear, colorless | yellowish, clear, flowable | clear colorless, flowable |

Results of the viscosity masurements (Brookfield RV, 20 rpm, 25° C. Rt)

| No. | Combinations, comprising: | Viscosity of methylhydroxyethylcellulose as 1% aqueous solution mPa·s | Viscosity of combination described, measured as X% aqueous solution mPa·s |
|---|---|---|---|
| a | 1.7 pbw of methylhydroxyethylcellulose<br>+0.3 pbw of superabsorbent (1) | — | 29,300 mPa·s (as 1% aqueous solution) |
| b | 1.7 pbw of methylhydroxyethylcellulose<br>+0.2 pbw of superabsorbent (1)<br>+0.2 pbw of naphthalenesulfonic acid/formaldehyde condensation product sodium salt | — | 26,000 mPa·s (as 1% aqueous solution) |
| c | methylhydroxyethylcellulose without additives | 2,400 | — |

1. Paste-like tile adhesive (continued)

|  | a (comparative sample) | b | c | d |
|---|---|---|---|---|
| Tiles loaded with 1 kg | 20 | 25 | 25–30 | 20–25 |
| Tiles loaded with 2 kg | 30 | 35 | 35–40 | 30–35 |

2. Ready-mixed jointing compound

|  | a | b | c | d |
|---|---|---|---|---|
| Filler mixture (finely ground calcium carbonate 0–20 μm) | 58 | 58 | 58 | 58 |
| Finely ground mica | 4 | 4 | 4 | 4 |
| Attapulgite, finely ground (as inorganic thickener) | 2.5 | — | 2.5 | — |
| Methylhydroxyethylcellulose or methylhydroxypropylcellulose visc. level 15000–60000 mPa·s (2% aqueous solution) | 0.50 | 0.25 | 0.40 | 0.30 |
| Hydroxyethylcellulose visc. level 15000–60000 mPa·s (2% aqueous solution) | — | — | 0.10 | — |
| Superabsorbent (1) | — | 0.25 | — | 0.20 |
| Water | 30–35 | 30–35 | 30–35 | 30–35 |
| Plastic dispersion (containing polyvinyl acetate plasticized with 10% of dibutyl phthalate | 4–6 | 4–6 | 4–6 | 4–6 |
| Antifoam | 0.1 | 0.1 | 0.1 | 0.1 |
| Preservative | 0.1 | 0.1 | 0.1 | 0.1 |
| Propylene glycol | 1.0 | 1.0 | 1.0 | 1.0 |
| Consistency of the compound and processability | somewhat viscous and tacky, extensive after-thickening | easily processable, no after-thickening of the paste-like material | more easily processable than less tacky, extensive after-thickening of the paste-like material | easily processable, no after-thickening of the paste-like material |
| Shrinkage behavior of the hardened material on gypsum-board sheeting | extensive shrinkage, cracking in the hardened material | reduced shrinkage, hardly any cracks | extensive shrinkage, too many cracks in the hardened material | no shrinkage, hardly any cracking in the hardened material |

3. Pulverulent jointing compound (without addition of gypsum)

|  | a | b | c | d |
|---|---|---|---|---|
| Filler mixture (comprising finely ground calcium carbonate, mica, talc) | 92–94 | 92–94 | 92–94 | 92–94 |
| Bentonites | 0.6–1 | 0.6–1 | 0.5 | — |
| Plastic dispersion powder (copolymer of vinyl acetate/ethylene or versatic ester) | 3–6 | 3–6 | 3–6 | 3–6 |
| Polyvinyl alcohol (low-molecular-weight) | 0.4–0.8 | 0.4–0.8 | 0.4–0.8 | 0.4–0.8 |
| Methylhydroxyethylcellulose or methylhydroxypropylcellulose visc. level 10000–100000 mPa·s (2% aqueous solution) | 0.60 | 0.24 | 0.20 | 0.35 |
| Carboxymethylhydroxyethylcellulose visc. level 3000–10000 mPa·s (2% aqueous solution) | — | 0.30 | 0.30 | — |
| Superabsorbent (1) | — | 0.06 | 0.1 | 0.25 |
| Addition of water per 100 g of pulverulent mixture | 45–50 | 45–50 | 45–50 | 45–50 |
| Consistency and processability of the compound mixed with water | good, slight structuring | good, slight improvement | very good, distinct improvement in the structure | very good, good structure and stability |
| Stability of consistency of the compound mixed with water | gradually after thickening (after 7 days) | hardly any after thickening | no after thickening | no after thickening |
| Shrinkage behavior and cracking on gypsum-board sheeting | extensive cracking | less cracking | hardly any shrinkage, hardly any cracking | hardly any shrinkage, no cracking |

The use of the polycondensation products in the combinations described of derivatives of natural polymers with superabsorbents leads to transparent, predominantly still pourable polymer solutions. Particularly advantageous are additions of melamine/formaldehyde condensation products, resulting in completely transparent and colorless solutions.

Solutions of natural polymers show in many cases naturally more or less extensive clouding, which is removed by addition of superabsorbents and melamine/formaldehyde condensation products. This optical effect represents an improvement in the quality of natural polymers in those applications in which solubility of the polymers in water with the formation of a transparent solution is necessary.

We claim:

1. A mixture consisting essentially of the following components
   a) at least 10% by weight of
      1) water-soluble natural polymer or
      2) a derivative of said water-soluble natural polymer selected from the group consisting of cellulose ethers, starch ethers, carboxymethyl guar, hydroxypropyl guar, carboxymethyl hydroxypropyl guar, and cationized guar.
   b. 1 to 89% by weight of an alkali metal salt or ammonium salt of a crosslinked polyacrylate which polyacrylate is optionally grafted with a starch, and c. 5 to 60% by weight of a water-soluble alkali metal salt or alkaline earth metal salt of an arylsulfonic acid/formaldehyde condensation product or of a sulfo-modified melamine/formaldehyde polycondensation product; said mixture is used in a building product.

2. The mixture as claimed in claim 1, wherein the amount of said component (a) in said mixture is 10 to 90% by weight.

3. The mixture as claimed in claim 1, wherein said polyacrylate is grafted with a starch.

4. A building material product as claimed in claim 1, wherein said component (a) consists essentially of a starch ether, cellulose ether, or guar gum.

5. The mixture as claimed in claim 1, wherein said mixture comprises 40 to 90% by weight of said component (a), 5 to 60% by weight of said component (b), and 5 to 40% by weight of said component (c).

6. The mixture as claimed in claim 1, wherein said product can be formulated as a dry composition, and wherein said product contains 0.01 to 2% by weight, relative to the dry composition, of said mixture.

7. A building material product as claimed in claim 6, wherein said product contains 0.1 to 0.5% by weight, relative to the dry composition, of said mixture.

8. The mixture as claimed in claim 6, which has been blended with water.

9. The mixture as claimed in claim 5, wherein component (b) is present in an amount from 10 to 60% by weight.

10. The mixture as claimed in claim 9, wherein component (c) is present in an amount from 10 to 40% by weight.

11. A building material as claimed in claim 10, wherein component (b) is present from 20 to 60% by weight.

12. A mixture consisting of the following components:
   a) at least 10% by weight of
      1) a water-soluble natural polymer or
      2) a derivative of said water-soluble natural polymer selected from the group consisting of cellulose ethers, starch ethers, carboxymethyl guar, hydroxypropyl guar, carboxymethyl hydroxypropyl guar, and cationized guar.
   b) 1 to 89% by weight of an alkali metal salt or ammonium salt of a crosslinked polyacrylate which polyacrylate is optionally grafted with a starch, and
   c) 5 to 60% by weight of a water-soluble alkali metal salt or alkaline earth metal salt of an arylsulfonic acid/formaldehyde condensation product or of a sulfo-modified melamine/formaldehyde polycondensation product: said mixture is to be used in a building product.

13. The mixture as claimed in claim 12, wherein said component consists of 40 to 90% by weight of component a), 20 to 60% by weight of component b) and 10 to 40% by weight of component c).

14. A mixture as claimed in claim 1, wherein said component (a) is selected from the group consisting of cellulose ethers, starch ethers, guar gum, xanthangum, carobseed flower, alginates and mixtures thereof.

* * * * *